US009250668B2

(12) United States Patent
Brock et al.

(10) Patent No.: US 9,250,668 B2
(45) Date of Patent: Feb. 2, 2016

(54) DECOUPLED POWER AND PERFORMANCE ALLOCATION IN A MULTIPROCESSING SYSTEM

(71) Applicant: International Business Machines Corporation, Armonk, NY (US)

(72) Inventors: Bishop Brock, Coupland, TX (US); Tilman Gloekler, Gaertringen (DE); Timothy G. Hallett, Oronoco, MN (US); Karthick Rajamani, Austin, TX (US); Guillermo J. Silva, Austin, TX (US); Gregory S. Still, Raleigh, NC (US); Malcolm S. Allen-Ware, Austin, TX (US); Todd J. Rosedahl, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 13/689,232

(22) Filed: Nov. 29, 2012

(65) Prior Publication Data
US 2014/0149755 A1     May 29, 2014

(51) Int. Cl.
*G06F 1/26*     (2006.01)
*G06F 1/32*     (2006.01)

(52) U.S. Cl.
CPC ... *G06F 1/26* (2013.01); *G06F 1/324* (2013.01); *G06F 1/3206* (2013.01); *G06F 1/3296* (2013.01); *Y02B 60/1217* (2013.01); *Y02B 60/1285* (2013.01)

(58) Field of Classification Search
CPC ......... G06F 1/26; G06F 1/324; G06F 1/3206; G06F 1/3296; Y02B 60/1217; Y02B 60/1285
See application file for complete search history.

(56) References Cited

U.S. PATENT DOCUMENTS

| 7,155,617 | B2 * | 12/2006 | Gary et al. ............... 713/300 |
| 7,421,599 | B2 | 9/2008 | Bahali et al. |
| 7,562,239 | B2 | 7/2009 | Fung |
| 7,814,350 | B2 * | 10/2010 | Gaskins et al. ........... 713/300 |
| 7,840,780 | B2 * | 11/2010 | Hughes et al. ............ 712/30 |
| 7,996,653 | B2 * | 8/2011 | Hughes et al. ............ 712/28 |
| 8,127,160 | B2 * | 2/2012 | Bieswanger et al. ...... 713/321 |
| 8,219,839 | B2 | 7/2012 | Akimoto |
| 8,635,478 | B2 * | 1/2014 | Chase et al. .............. 713/321 |
| 8,667,308 | B2 | 3/2014 | de Cesare et al. |
| 2004/0025069 | A1 * | 2/2004 | Gary et al. ............... 713/300 |
| 2009/0077407 | A1 | 3/2009 | Akimoto |
| 2009/0113221 | A1 | 4/2009 | Holle et al. |
| 2010/0095137 | A1 * | 4/2010 | Bieswanger et al. ...... 713/300 |

(Continued)

OTHER PUBLICATIONS

Broyles, Martha et al., "IBM EnergyScale for POWER7 Processor-Based Systems", Nov. 2007, 1-66 pages.

(Continued)

*Primary Examiner* — M Elamin
(74) *Attorney, Agent, or Firm* — DeLizio Law, PLLC

(57) ABSTRACT

A maximum and a minimum performance operating limit is set for a plurality of processing units in accordance with a set of one or more rules enforced by the performance supervisor. Each of the plurality of processing units has logic configured to ensure a request for an operational setting complies with the maximum and minimum operating limits. Each of the plurality of processing units is configured to output a request for a limit compliant operational setting to a performance controller. The performance controller is configured to actuate the operational request.

15 Claims, 6 Drawing Sheets

(56) References Cited

U.S. PATENT DOCUMENTS

2011/0024800 A1* 2/2011 Hughes et al. ............... 257/209
2011/0314305 A1 12/2011 de Cesare et al.
2012/0195355 A1 8/2012 El-Essawy et al.
2012/0198255 A1* 8/2012 Chase et al. ............... 713/322

OTHER PUBLICATIONS

"U.S. Appl. No. 13/762,538 Office Action", Jan. 5, 2015, 8 pages.
"U.S. Appl. No. 13/762,538 Final Office Action", Apr. 22, 2015, 5 pages.

* cited by examiner

DECOUPLED POWER AND PERFORMANCE ALLOCATION IN A MULTIPROCESSING SYSTEM

BACKGROUND

Embodiments of the inventive subject matter generally relate to the field of computer systems and more particularly, to power management for computer systems.

Various techniques have been used in an attempt to reduce power consumption while maintaining system performance. For example, some systems use dynamic voltage and frequency scaling (DVFS). DVFS modifies the voltage supplied to the system and the frequency at which the processor operates. DVFS may allow a system to operate in low-power states, and only have increased power consumption when necessary. For example, during a high workload period, the voltage supplied to the system and the frequency at which the processor operates may be high. During a low workload period, DVFS may decrease the voltage supplied to the system and decrease the frequency at which the processor operates.

When a component operating in a low-power state receives an increased workload, that component will make a voltage-frequency request ("V/F request"). This V/F request will indicate an increased voltage-frequency pair ("V/F pair") at which the component would like to operate to accommodate the increased workload. Similarly, when the workload of a component decreases, the component will make a V/F request, indicating a lower V/F pair at which the component would like to operate.

SUMMARY

Embodiments of the inventive subject matter include setting minimum and maximum performance operating limits for each of a plurality of controllers. The operating limits are set in accordance with performance rules imposed on the system. In response to a request to change operation of a processing unit to a requested operational setting, it is determined whether the requested operational setting complies with the minimum and maximum performance operating limits. The minimum performance operating limit is sent to a performance controller if the requested operational setting does not comply with the minimum performance operating limit. The maximum performance operating limit is sent to a performance controller if the requested operational setting does not comply with the maximum performance operating limit. The requested operational setting is sent to a performance controller if the requested operational setting complies with the minimum and maximum performance operating limits.

A performance supervisor computer program product is configured to set a maximum and a minimum performance operating limit for a plurality of processing units in accordance with a set of one or more rules enforced by the performance supervisor. Each of the plurality of processing units has logic configured to ensure a request for an operational setting complies with the maximum and minimum operating limits. Each of the plurality of processing units is configured to output a request for a limit compliant operational setting to a performance controller. The performance controller is configured to actuate the operational request.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
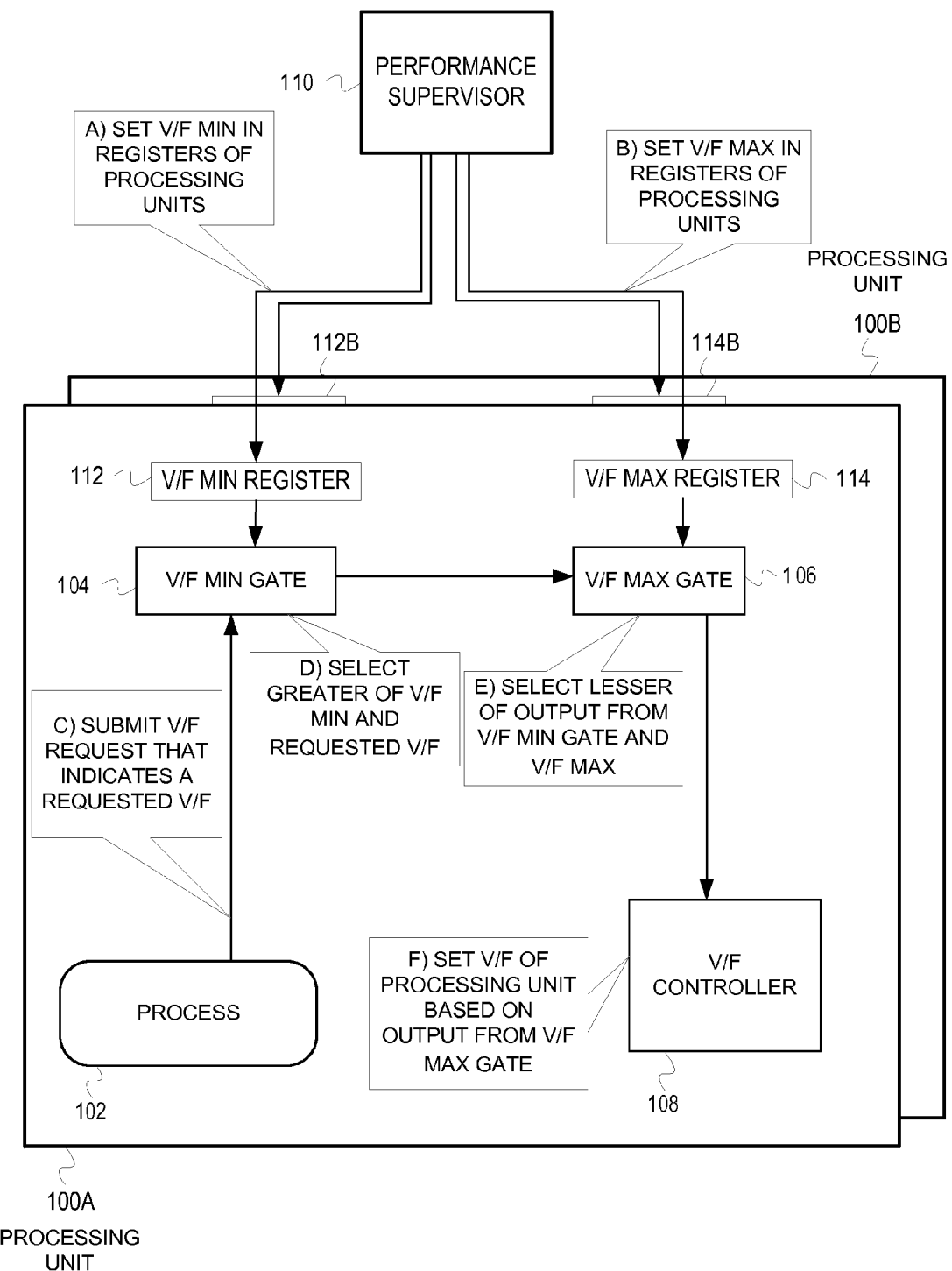
FIG. 1 depicts a conceptual diagram of an example system architecture with logic gates to ensure V/F requests conform to supervisor defined limits.

The description that follows includes exemplary systems, methods, techniques, instruction sequences and computer program products that embody techniques of the present inventive subject matter. However, it is understood that the described embodiments may be practiced without these specific details. For instance, although examples refer to a voltage/frequency request comprising a single voltage/frequency request made by a single component, a voltage/frequency request may refer to a plurality of voltage/frequency requests from a plurality of components aggregated into a single voltage/frequency request. The examples also refer to V/F pairs, but embodiments can process voltage and frequency separately. In other instances, well-known instruction instances, protocols, structures and techniques have not been shown in detail in order not to obfuscate the description.

A multiprocessing system has multiple processing units (e.g., multiple single core processors, multiple multi-core processors, a mixture of single core and multi-core processors, etc.). In a multiprocessing system designed with a performance supervisor, the performance supervisor is responsible for managing performance of the processing units. Managing performance of the processing units involves enforcing rules on the system that affect system performance. Examples of regulations enforced by a performance supervisor include processing unit power limits, system power limits, system operational constraints, etc. A performance supervisor may enforce rules pursuant to quality of service agreements, energy management policies, performance issues, etc.

When the workload of a processing unit changes (or in anticipation of a workload change), the processing unit may make a request to change an operational setting that affects performance (e.g., a V/F request). The V/F request then passes to the performance supervisor, which can either deny or grant the V/F request. If the performance supervisor determines that the V/F request will not violate rules enforced by the performance supervisor, the performance supervisor will grant the request. The performance supervisor may then communicate the approval (or denial) of the request to a voltage/frequency controller ("V/F controller") that will actuate the request.

Removing the performance supervisor as an intermediary for evaluating V/F requests eliminates the overhead and latency introduced by this intermediary role for V/F requests. Instead of processing each V/F request individually, the performance supervisor sets minimums and maximums for voltage and frequency ("V/F min and V/F max limits") for the processing units. The performance supervisor sets the limits based on rules enforced by the performance supervisor. With the V/F min and V/F max limits, V/F requests can be serviced without an exchange with the performance supervisor. The V/F requests can be serviced without the exchange with the performance supervisor because logic gates will read and apply the V/F min and V/F max limits to the V/F requests. With the logic gates applying the V/F min and V/F max limits to the V/F requests to produce limit-conforming requests, the V/F controller can set voltage and/or frequency of the processing unit without violating rules enforced by the performance supervisor. And the requests can be serviced without incurring the overhead of approval/denial by the performance supervisor.

FIG. 1 depicts a conceptual diagram of an example system architecture with logic gates to ensure V/F requests conform to supervisor defined limits. FIG. 1 depicts a performance supervisor 110 coupled with multiple processing units 100A, 100B. The processing unit 100A comprises a V/F min gate 104, a V/F min register 112, a V/F max gate 106, a V/F max register 114, and a V/F controller 108. The processing unit 100B comprises similar components, but FIG. 1 only depicts a V/F min register 112B and a V/F max register 114B. FIG. 1 depicts example operations at stages A-F. The stages are examples and are not necessarily discrete occurrences over time (e.g., operations of different stages may overlap). In order to maintain clarity in the description, the operations at stages C-F will be described with respect only to the first processing unit 100A. It should be noted that the operations at stages C-F can likewise be performed with respect to the second (and any further) processing unit(s) 100B. Although only two processing units are shown in order not to complicate the figure, the system may include more than two processing units.

At stage A, the performance supervisor 110 sets a minimum performance operating limit ("V/F min") for the processing units 100A, 100B. The minimum performance operating limit may be a minimum voltage, a minimum frequency, or both. The performance supervisor 110 writes a minimum voltage limit and a minimum frequency limit ("V/F min") to the V/F min registers 112, 112B.

At stage B, the performance supervisor 110 sets a maximum performance operating limit ("V/F max") for the processing units 100A, 100B. The maximum performance operating limit may be a maximum voltage, a maximum frequency, or both. The performance supervisor 110 writes a maximum voltage limit and a maximum frequency limit ("V/F max") to the V/F max registers 114, 114B. Implementations can allocate a memory location to host the minimum voltage and the minimum frequency limits, or designate different memory locations for the voltage and frequency limits. Likewise, implementations can allocate a memory location to host the maximum voltage and the maximum frequency limits, or designate different memory locations for voltage and frequency limits.

At stage C, a process 102 submits a V/F request that indicates a requested V/F pair. The process 102 is an instance of program instructions being executed by the processing unit 100A. V/F requests for the processing unit 100A can vary depending on the processing unit's 100A past, current, or expected workload. A V/F request can be for an increased operating voltage or frequency during periods of high workload, or for a decreased operating voltage or frequency during light workloads or idle states. The voltage and frequency indicated in the V/F request pass to the V/F min gate 104.

At stage D, the V/F min gate 104 selects the greater of the V/F min and the requested V/F to output to the V/F max gate 106. If the requested V/F is less than the V/F min set by the performance supervisor 110, the V/F min gate 104 effectively clips the V/F request to conform to the V/F min when selecting the greater of the two.

At stage E, the V/F max gate 106 selects the lesser of the V/F max and the output from the V/F min gate 104. The selected value(s) is output to the V/F controller 108. If the output from the V/F min gate 104 is greater than the V/F max set by the performance supervisor 110, the V/F max gate 106 effectively caps the V/F request to conform to the V/F max when selecting the lesser of the two.

At stage F, the V/F controller 108 sets the V/F level of processing unit 100A according to the output from the V/F max gate 106.

Embodiments may vary from the system depicted in FIG. 1. For instance, the V/F controller may be separate from the processing unit. Output from the V/F max gate may pass directly to V/F controller that is separate from the processing unit. Embodiments can order the V/F max and V/F min gates differently or in parallel. For example, both limits can be applied to a request in parallel. The output of the V/F min gate and the output of the V/F max gate are then compared against the original requested values. Whichever output values do not match the original requested values continue to the V/F controller. If the outputs have not been modified, then the originally requested values continue to the V/F controller. In addition, embodiments are not limited to passing a request through both the V/F max and the V/F min gates. Embodiments can implement circuitry/logic that determines whether a V/F request has been capped or clipped. If so, then the output can go directly to the V/F controller based on an assumption that the limits are related—for example, the max limit will not be lower than the minimum limit. Further, embodiments can design separate pathways for the requested voltage and the requested frequency.

Figure 2:
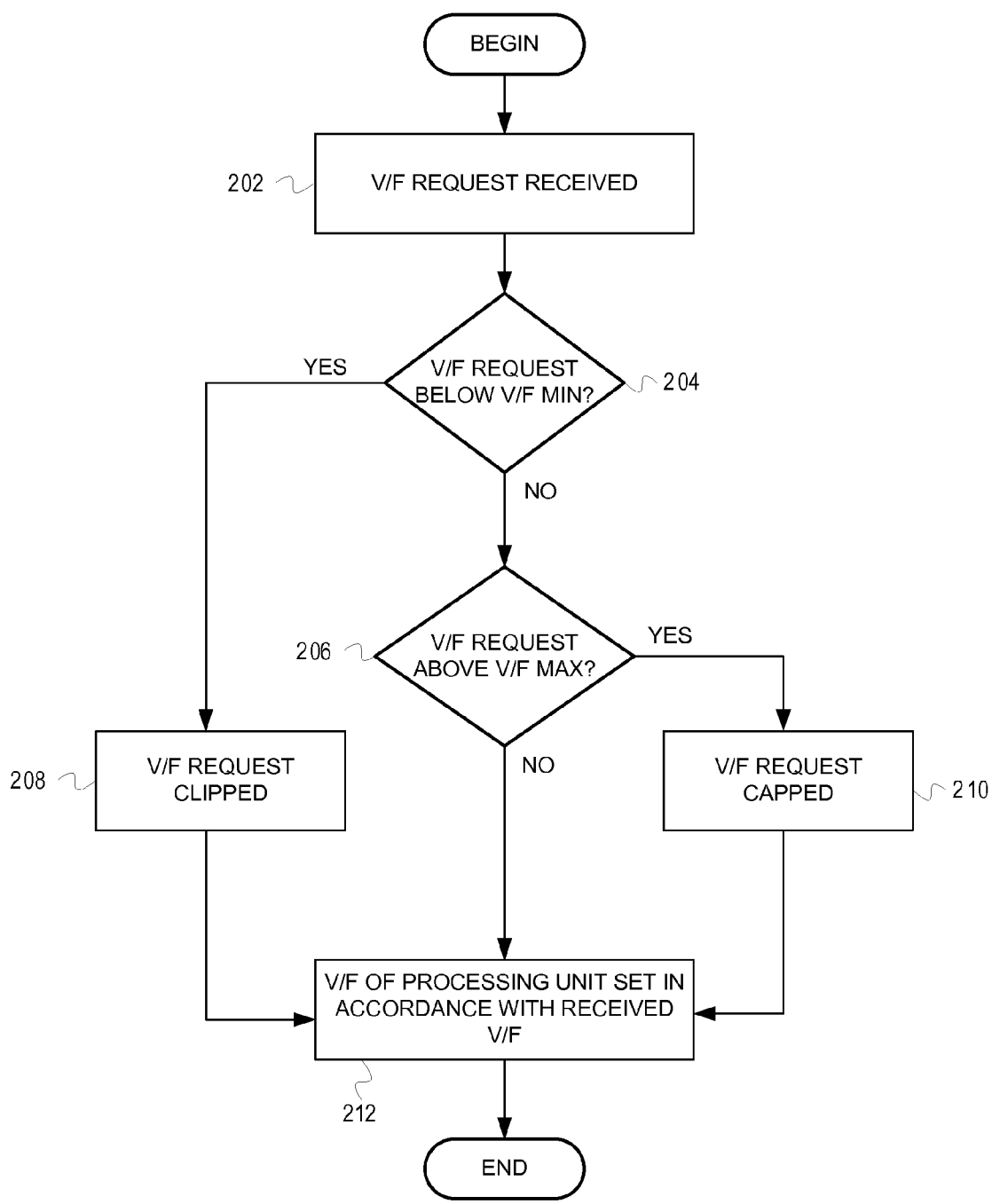
FIG. 2 is a flow diagram of example operations for updating V/F levels without supervisor evaluation.

FIG. 2 is a flow diagram of example operations for updating V/F levels without supervisor evaluation. The flow begins at block 202.

At block 202, a V/F request for a processing unit is received. The V/F request may indicate an increased or decreased V/F pair, depending on the past, current, or expected workload of the processing unit. The V/F request may originate from code executing on the processing unit, an operating system process, a virtual machine manager, etc. The flow continues at block 204.

At block 204, the requested V/F is compared against a V/F minimum previously set by a supervisor. For example, the request indicates a voltage and frequency pair. The requested voltage is compared against the set voltage minimum, and the requested frequency is compared against the set frequency minimum. If both of the requested voltage and the requested frequency are greater than the set minimum corresponding thereto, the requested V/F continues and the flow continues to block 206. If either of the requested V/F is less than the corresponding one of V/F min, then the flow continues to block 208.

At block 208, the non-conforming V/F request is clipped. That is, the violating one of the requested V/F is replaced with the corresponding one of V/F min. For instance, the requested voltage may be less than the voltage minimum but the requested frequency is greater than the frequency minimum. In that case, the requested voltage is replaced with the minimum voltage. The clipped V/F request is passed to a V/F controller. The flow continues at block 212.

As previously discussed, if both of the requested voltage and frequency are greater than the V/F min, the requested voltage and frequency pass unaltered and the flow continues at block 206. At block 206, the requested voltage and frequency are compared against the V/F max. If the requested voltage and frequency are less than the V/F max, the requested voltage and frequency pass unaltered to a V/F controller and the flow continues at block 212. If the either of the requested voltage and frequency is greater than the corresponding one of the V/F max, then the flow continues at block 210.

At block 210, the non-conforming V/F request is capped. That is, the violating one, if not both, of the requested voltage and frequency is replaced with the corresponding one of the V/F max. The capped V/F request passes to the V/F controller. The flow continues at block 212.

At block 212, the voltage and frequency for the processing unit is set in accordance with the received V/F pair. If either one or both of the requested voltage and frequency was clipped at block 208, then the V/F is set in accordance with the clipped V/F request. If either one or both of the requested voltage and frequency was capped at block 210, then the V/F is set in accordance with the capped V/F request.

Figure 3:
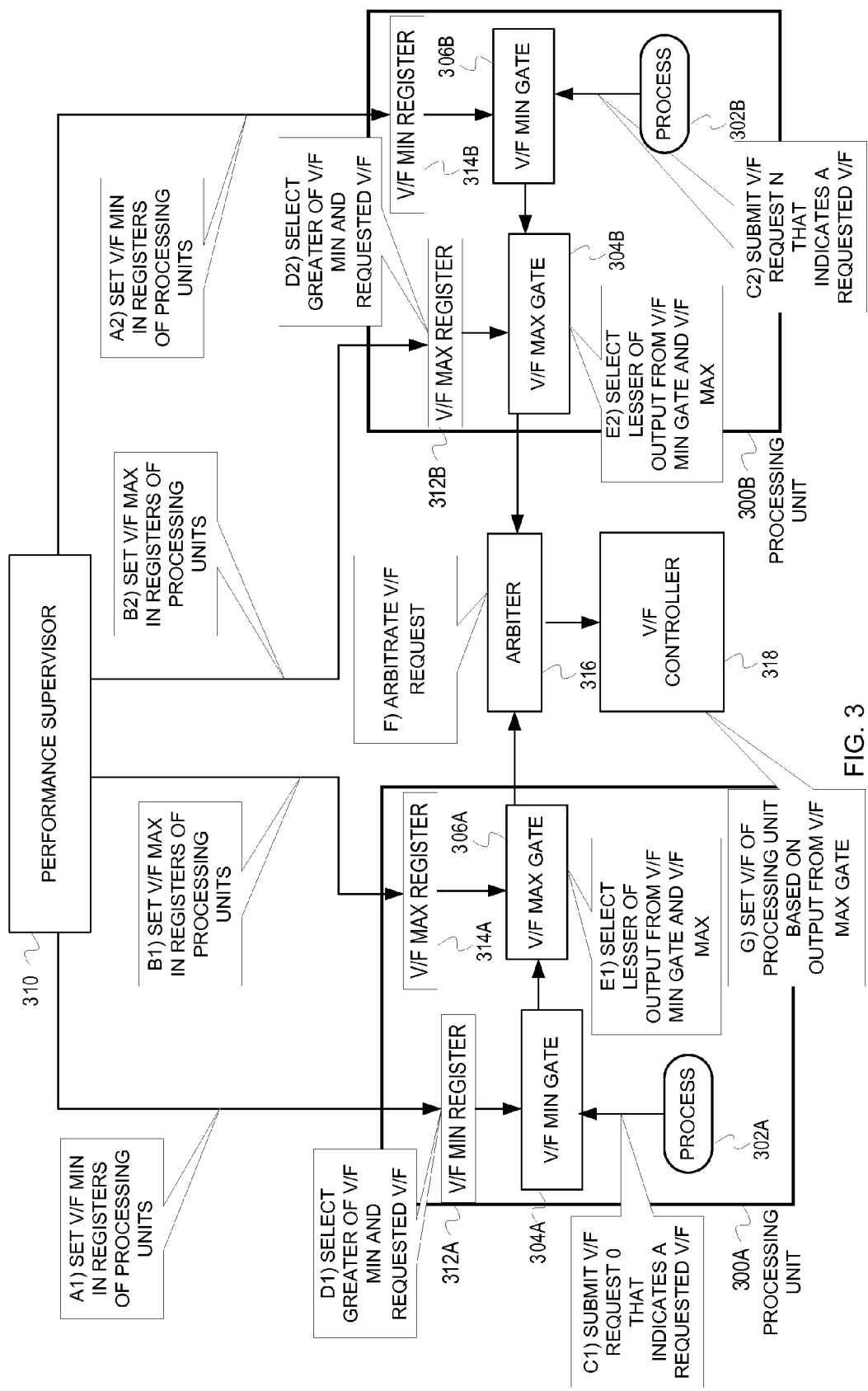
FIG. 3 depicts a conceptual diagram of an example system architecture which arbitrates V/F requests from multiple processing units.

FIG. 3 depicts a conceptual diagram of an example system architecture which arbitrates V/F requests from multiple processing units. FIG. 3 depicts a performance supervisor 310 coupled with multiple processing units 300A, 300B. The processing units 300A, 300B respectively comprise: V/F min gates 304A, 304B, V/F min registers 312A, 312B, V/F max gates 306A, 306B, and V/F max registers 314A, 314B. FIG. 3 depicts example operations at stages A-G. The stages are examples and are not necessarily discrete occurrence over time (e.g., operations of different stages may overlap). Stages A-E each comprise stage A1 and stage A2, stage B1 and stage B2, etc., corresponding to processing units 300A and 300B, respectively. The stages 1 and 2 (e.g., A1 and A2) may be asynchronous. In order to maintain readability, the operations at stages A-E will be described simply as stage A, stage B, etc., to avoid repeating the stages while depicting that the similar operations occur across the processing units.

At stage A, the performance supervisor 310 sets a V/F min for the processing units 300A, 300B. The performance supervisor 310 writes a minimum voltage limit and a minimum frequency limit to the V/F min registers 312A, 312B.

At stage B, the performance supervisor 310 sets a V/F max for the processing units 300A, 300B. The performance supervisor 310B writes a maximum voltage limit and a maximum frequency limit ("V/F max") to the V/F registers 314A, 314B. Implementations can allocate a memory location to host the minimum voltage and the minimum frequency limits (e.g., a same cache line for voltage and frequency), or designate different memory locations for the voltage and frequency limits (e.g., different cache lines for voltage and frequency). Likewise, implementations can allocate a memory location to host the maximum voltage and maximum frequency limits, or designate different memory locations for voltage and frequency limits.

At stage C, processes 302A, 302B submit V/F requests that indicate a requested V/F pair. The processes 302A, 302B are instances of program instructions being executed by the processing units 300A, 300B. V/F requests for the processing units 300A, 300B can vary depending on the processing units' 300A, 300B past, current, or expected workload. A V/F request can be for an increased operating voltage or frequency during periods of high workload, or for a decreased operating voltage or frequency during light workloads of idle states. The voltage and frequency indicated in the V/F requests pass to the V/F min gates 304A, 304B.

At stage D, the V/F min gates 304A, 304B select the greater of the V/F min and the requested V/F to output to the V/F max gates 306A, 306B. If the requested V/F(s) is less than the V/F min set by the performance supervisor 310, the V/F min gates 304A, 304B effectively clip the V/F request(s) to conform to the V/F min when selecting the greater of the two.

At stage E, the V/F max gate 306A, 306B select the lesser of the V/F max and the outputs from the V/F min gate 304A, 304B. If the requested V/F is greater than the V/F max set by the performance supervisor 310, the V/F max gate 306A, 306B effectively clips the V/F request to conform to the V/F max when selecting the lesser of the two. The selected output from processing unit 300A and the selected output from 300B are output to the arbiter 316.

At stage F, the arbiter 316 arbitrates the V/F request from processing unit 300A and the V/F request from processing unit 300B. In some embodiments, the processing units 300A and 300B may be configured in such a way that there is a common voltage between processing unit 300A and processing unit 300B. However, the frequency at which processing unit 300A, 300B operate may not be required to be synchronous. In situations where processing unit 300A and processing unit 300B request dissimilar V/F pairs, the arbiter 316 evaluates the requests and selects one of the requests. The arbiter 316 can select from submitted requests in accordance with an auction technique to determine which of the submitted V/F requests corresponds to a highest performance point. The arbiter 316 outputs the selected V/F request to the V/F controllers. In arbiter 316 may be programmed/configured to select from the submitted requests in accordance with other techniques. For instance, the arbiter 316 may be configured to select in accordance with input from the performance supervisor 310. In addition, the arbiter 316 may discard an input V/F request based on error/status information. For example, the arbiter 316 can access flags that indicate whether a processing unit has possible errors or has been de-configured (i.e., removed from service).

At stage G, the V/F controller 318 sets the V/F level of processing units 300A, 300B according to the output from the arbiter 316.

Figure 4:
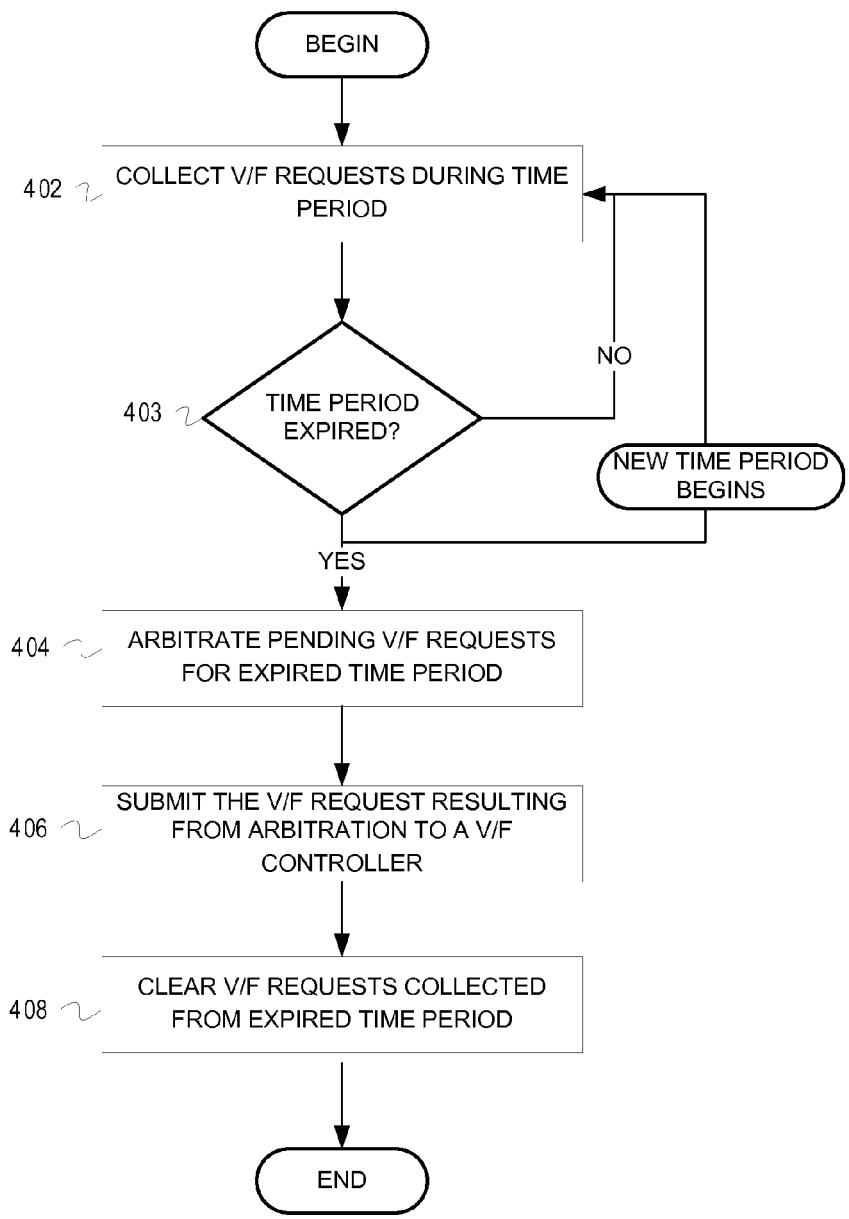
FIG. 4 is a flow diagram of example operations for arbitrating V/F requests.

FIG. 4 is a flow diagram of example operations for arbitrating V/F requests. The flow begins at block 402.

At block 402, V/F requests are collected from processing units of a system during a time period. The time period can be defined by either of arbiter firmware and the performance supervisor. In addition, the arbiter may define a time period that can be reset by the performance supervisor. A pulse that signals the beginning/ending of each time period may be generated from the performance supervisor, the arbiter, a system clock, etc. In some embodiments, the time period can begin as soon as a V/F request is sent. If V/F requests arrive during arbitration, the arriving V/F requests can be arbitrated as soon as the current arbitration is done. The flow continues at block 403.

At block 403, it is determined whether the time period expired. The expiration of a time period for collected V/F requests can be tracked for a group of requests or for each V/F request. For example, V/F requests can be written to memory locations indexed by an indication of time period. The arbiter may use two indicators to track V/F requests across time periods. For instance, sets a flag to 0 for a current time period and tags all V/F requests (or the memory location that hosts the V/F requests) with the 0. When the time period expires (e.g., 3 cycles pass), the arbiter changes the flag to 1 and tags the collected V/F requests with a 1. Embodiments can alternatively alternate between memory locations. For example, the arbiter can write V/F requests to memory locations that alternate based on expiration of time period with the expectation that the V/F requests can be overwritten every other time period because arbitration will have completed. If the time period has not expired, then control flows back to block 402 for collection to continue. If the time period has expired, control flows to both blocks 402 and 404.

At block 404, the pending V/F requests of the expired time period are arbitrated while V/F requests are collected for the current time period. In some embodiments, the arbiter holds a V/F auction. In other words, the V/F requests are compared and the arbiter selects the V/F request corresponding to the highest performance point among the arbitrated requests. In other embodiments, the arbiter selects a V/F request based on input from the performance supervisor ("intelligent selection"). During intelligent selection, the performance supervisor may use information both internal and external to the requesting processing units in determining which V/F request will be submitted to the V/F controller. For example, the performance supervisor may consider the past, current, or expected workloads of the requesting processing units. For instance, the expected workload for one of the requesting processing units may be high. The performance supervisor may select the higher V/F request based on this expected workload. The performance supervisor may also consider information external to the requesting processing units. For example, the power consumption of the system may be close to or above the power cap for the system. The performance supervisor may select the lower V/F request based on the high power consumption of the system. As another example, the performance supervisor may set values or provide control input to the arbiter for arbitration based on error/status information for the processing units. Additionally, the performance supervisor may consider the V/F change latency of the processing units. For example, if the V/F change latency is high, the performance supervisor may use a multiple-period V/F request maximum in selecting a V/F request. This can be implemented to ensure that voltage will be available for short-duration requests to run processing units at high performance points. The flow continues at block 406.

At block 406, the V/F request resulting from arbitration is submitted to a V/F controller. The V/F controller then actuates the V/F request for the system.

At block 408, the V/F requests collected during the expired time period are cleared. After submitting the V/F request yielded from arbitration to the V/F controller, the arbiter clears the memory location(s) (e.g., registers) that hosts the V/F requests of the arbitration. As stated earlier, embodiments can overwrite requests instead of clearing them.

Although FIG. 4 depicts operations that select among V/F requests on a time period basis, embodiments can implement an arbiter that continuously selects among V/F requests. Each of the processing units writes their V/F request into memory elements (e.g., buffers, registers, etc.). The V/F requests are coupled to input the V/F requests into arbiter logic that selects from the input based on either of the intelligent selection technique or the auction technique. The selected input then flows into a memory element designated to host a target V/F. A stepping mechanism begins stepping up the operational setting of the processing units to achieve the target V/F. The stepping mechanism tracks each step, referred to herein as a "current V/F step". Since the target V/F is continuously updated in accordance with the arbiter selection, a change in the target V/F may cause the stepping mechanism to change direction before the current V/F step reaches the target V/F. In the case of the arbiter selecting a V/F request that lowers the target V/F, energy can be saved because the stepping mechanism will not step all the way up to the greater, previous old target V/F or the new target V/F is less than or equal to the current V/F.

Figure 5:
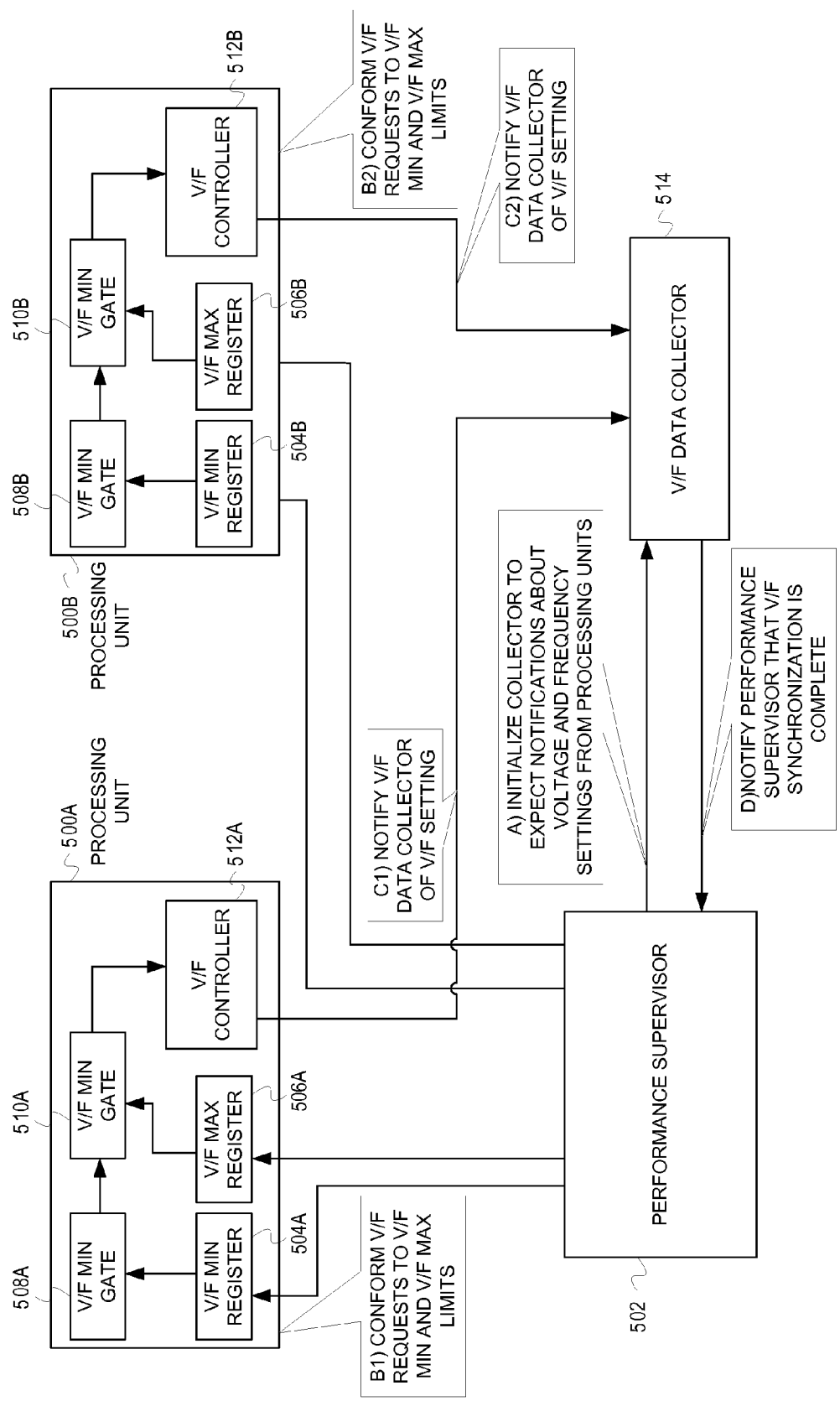
FIG. 5 depicts a conceptual drawing of an example system architecture that synchronizes V/F requests across processing units.

FIG. 5 depicts a conceptual drawing of an example system architecture that synchronizes V/F requests across processing units. Such synchronization may allow the performance supervisor 502 to be assured that the V/F level of each processing unit 500A and 500B is within the V/F min and V/F max limits set by the performance supervisor 502. FIG. 5 includes two processing units 500A, 500B, a performance supervisor 502, and a V/F data collector 514. Each processing unit 500A, 500B comprises a V/F min register 504A, 504B, a V/F min gate 508A, 508B, a V/F max register 506A, 506B, a V/F max gate 510A, 510B, and a V/F controller 512A, 512B. Although only two processing units are shown in order not to complicate the figures, the system may include more than two processing units. FIG. 5 depicts example operations at stages A-D. The stages are examples and are not necessarily discrete occurrences over time (e.g., operations at different stages may overlap). Stages B-C each comprise stage B1 and stage B2, and stage C1 and stage C2, corresponding to processing units 500A and 500B, respectively. The stages 1 and 2 (e.g., B1 and B2) may be asynchronous. In order to maintain readability, the operations at stages B-C will be described simply as stage B and stage C, to avoid repeating the stages while depicting that the similar operations occur across the processing units.

At stage A, the performance supervisor 502 initializes the V/F data collector 514 to expect notifications about voltage and frequency settings from the processing units 500A, 500B. The supervisor 502 may initialize the collector 514 to expect a specific number of notifications, or to expect notifications from a specific set of processing units (e.g., by processing unit identifiers), etc.

At stage B, the processing units 500A, 500B conform respective V/F requests to the V/F min and V/F max limits. V/F requests are conformed by the processing units 500A, 500B. Such conforming may include submitting a V/F request, comparing the V/F request at a V/F min gates 504A, 504B, comparing the V/F request at a V/F max gates 506A, 506B, and the V/F controllers 512A, 512B setting the V/F level of the processing units 500A, 500B.

At stage C, the processing units 500A, 500B notify to the V/F data collector 514 that voltages and frequencies of the processing units 500A, 500B have been actuated. As each of the processing units 500A, 500B achieves a V/F pair that is within the V/F min and V/F max limits, the processing units 500A, 500B can notify the V/F data collector that they are within the V/F min and V/F max limits. The notification may be explicit or implicit. For example, the notification can indicate voltage and frequency set by a processing unit and the limits for that reporting processing unit. Or the notification can indicate completion. Since the data collector was previously initiated to expect notifications, the notification of completion implicitly indicates that the processing unit has set voltage and frequency within limits set by the performance supervisor.

At stage D, the V/F data collector notifies the performance supervisor 502 that the V/F synchronization is complete. Once all expected notifications have been received (i.e., V/F setting synchronization is complete), the V/F data collector can communicate that fact to the performance supervisor 502. The communications depicted between a supervisor, a data collector, and processing units of a system may be signals communicated over wires or packets carried over communications infrastructure.

Figure 6:
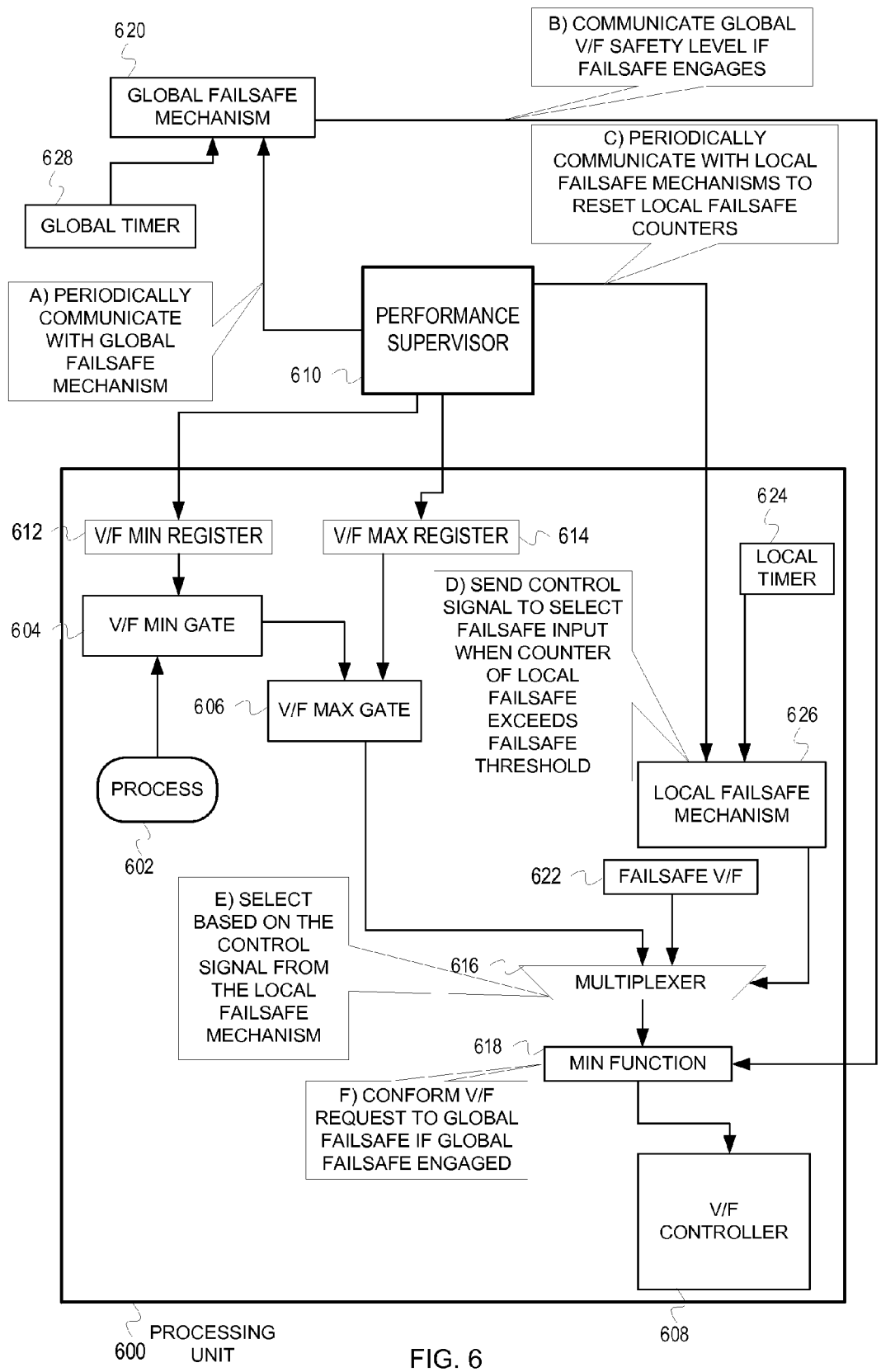
FIG. 6 depicts a conceptual diagram of an example system architecture with global and local failsafe mechanisms.

FIG. 6 depicts a conceptual diagram of an example system architecture with global and local failsafe mechanisms. FIG. 6 depicts a performance supervisor 610 coupled with a processing unit 600, a global failsafe mechanism 620, and a local failsafe mechanism 614. The processing unit 600 comprises a V/F min gate 604, a V/F min register 612, a V/F max gate 606, a V/F max register 614, a local timer 624, a local failsafe mechanism 626, a multiplexer 616, a min function logic 618, and a V/F controller 608. FIG. 6 depicts example operations at stages A-F. The stages are examples and are not necessarily discrete occurrences over time (e.g., operations of different stages may overlap). And the operations depicted in FIG. 6 may occur at different moments. For instance, the stages related to the global failsafe mechanism operate asynchronously and independent of the stages related to the local failsafe mechanism. Although only one processing unit is shown in order not to complicate the figure, the system includes more than one processing unit coupled with the supervisor 610 and the global failsafe mechanism 620. The failsafe mechanisms 620, 626 cap V/F levels throughout the system when the performance supervisor 610 fails. Thus, the system can continue operating at a safe level even though the performance supervisor 610 is not available to react to situations that impact operations (e.g., excessive heat in the system, failed power supply, etc.).

The global timer 628 (e.g., system clock) sends timing pulses to the global failsafe mechanism 620. The global failsafe mechanism 620 updates a counter every pulse or every n pulses from the global timer, depending upon configuration of the global failsafe mechanism. If the counter reaches a predefined threshold, then the global failsafe mechanism sends out a safe maximum V/F level to processing units of the system to ensure the processing units do not exceed that safe maximum voltage level. At stage A, the performance supervisor 610 periodically communicates with the global failsafe mechanism 620 to reset the counter at specified intervals. Should the performance supervisor 610 fail to communicate with the global failsafe mechanism 620 and reset the counter before the end of the specified interval, the global failsafe mechanism 620 engages.

At stage B, if the global failsafe mechanism 620 is engaged, the global failsafe mechanism communicates a global V/F safety level to the min function logic 618. The global V/F safety level is a V/F level that ensures that the V/F level of the system's components will remain within a level that will not harm the system under anticipated worst case scenarios. The global V/F safety level is configured in light of the anticipated worst case scenarios for the system. Although not depicted, the global V/F safety level is stored at system initialization in a memory element accessible by the global failsafe mechanism 620, and can be changed through system configuration. Use of the global V/F safety level by the min function logic 618 is described with reference to Stage F.

Similar to the global failsafe mechanism 620, the local failsafe mechanism 626 receives timing pulses from the local timer 624. The local failsafe mechanism 626 increments a counter every pulse or every n pulses received from the local timer 624. If the counter reaches a predefined threshold, then the local failsafe mechanism 626 sends an enable/control signal to the multiplexer 616. The control signal sets the multiplexer 616 to select input from the failsafe V/F memory element 622 instead of input from the V/F max gate 606. The failsafe V/F memory element 616 hosts a V/F setting considered safe under worst case scenarios that is set at system initialization and/or during system configuration. As described earlier, the V/F min gate 604 and the V/F max gate 606 output a limit compliant V/F setting. Stages C-E refer to the local failsafe mechanism operation. At stage C, the performance supervisor 610 periodically communicates with the local failsafe mechanism 626. The performance supervisor 610 communicates periodically to reset the counter of the local failsafe mechanism 626 at specified intervals. If the performance supervisor 610 fails to communicate with and reset the counter before the end of the specified interval, the local failsafe mechanism 626 engages and sends the enable/control signal to the multiplexer 616.

At stage D, when the counter exceeds the local failsafe threshold, the local failsafe mechanism 626 is engaged and the local failsafe mechanism 626 sends the control signal to the multiplexer 616 to select the failsafe input from the failsafe V/F memory element 622. This indicates that the performance supervisor 610 has failed to reset the counter within the specified interval due to some failure (e.g., a performance supervisor process has died).

At stage E, the multiplexer selects between the failsafe V/F memory element 622 and the output from the V/F max gate 606. If the performance supervisor 610 has maintained communication with and reset the local failsafe counter within the specified interval, the local failsafe mechanism 626 will not have been engaged and the multiplexer 616 will select the output from the V/F max gate 606. If the performance supervisor 610 has failed to reset the local failsafe counter within the specified interval, the local failsafe mechanism 626 will have been engaged and the multiplexer 616 will select the failsafe V/F 622.

At stage F, the output from the multiplexer 616 is conformed to the current system voltage. If the performance supervisor 610 has maintained the global failsafe counter below the failsafe threshold, the output from the multiplexer 616 may pass unaltered to the V/F controller 608, depending on the voltage cap set in the min function logic 618. If the performance supervisor 610 has not maintained the global failsafe counter below the failsafe threshold, the global failsafe mechanism 620 will have sent the global V/F safety level to the min function logic 618. Thus, the min function logic 618 will conform the output from the multiplexer 616 to the global V/F safety level. The output from the min function 618 will then pass to the V/F controller 608.

It should be understood that the Figures and examples are intended to aid in understanding various embodiments of the inventive subject matter, and should not be used to limit scope of the claims. For instance, although the examples depict the V/F request passing first through the V/F min gate and second through the V/F max gate, this ordering is unnecessary. In some embodiments, the V/F request may pass first through the V/F max gate and second through the V/F min gate. Likewise, although the examples depict the performance supervisor first setting the V/F min register and second setting the V/F max register, this ordering is unnecessary. In some embodiments, the performance supervisor may first set the V/F max register and second set the V/F min register, or set the V/F max register and the V/F min register in parallel.

Embodiments may temporarily deactivate the grant/deny functionality of the performance supervisor. In some cases, the performance supervisor may be responsible for enforcing rules upon V/F requests that cannot be captured with a V/F min and a V/F max alone.

Although the examples discuss processes on processing units making V/F requests, a process executing on a first processing unit can submit a V/F request to change V/F of a second processing unit. For example, a process corresponding to a virtual machine manager, operating system, power manager, etc, running on a processing unit can submit V/F requests for other processing units.

Although the examples discuss either core-level or chip-level V/F control, embodiments may allow for a mix of local and global control. For example, individual cores may have frequency control, but only the multi-core chip has voltage control. In other words, there would be local frequency control and global voltage control. In other embodiments, the cores may have local voltage control that depends on a chip or system-wide voltage controlled by the performance supervisor.

Although the examples discuss the performance supervisor changing V/F min and V/F max levels in accordance with rules enforced by the performance supervisor, embodiments can set V/F min and max limits in order to reallocate power between processing units. It may be required that the performance supervisor is assured that the power of the donor core(s) is within the V/F min and V/F max limits before reallocating the power to the new core to avoid energy oversubscription and to maintain energy management policies. For example, the performance supervisor may poll the donor processing unit(s) to receive its current V/F level. The performance supervisor may then calculate an anticipated V/F level after-reallocation and compare this anticipated-reallocation V/F level against the V/F min and V/F max limits. If the anticipated-reallocation V/F level is within the V/F min and V/F max limits, the performance supervisor will continue the reallocation.

Although the examples refer to a V/F request as being a single V/F request from a single processing unit, in some embodiments, a V/F request may be a plurality of V/F settings combined into a single request. For example, a multi-core chip/processor may aggregate the V/F requests of each core into a single V/F request representative of all of the requests. Additionally, a performance state ("Pstate") may be used to refer to a plurality of V/F settings. For example, the Pstate P0 may refer to a performance state where a processing unit is operating at maximum voltage and maximum frequency, while Pstates P1, P2, etc. may refer to successively lower V/F levels. With regard to Pstates, a processing unit may make a V/F request that requests a specific Pstate.

Although examples depict processing units with respective V/F min registers, V/F max registers, V/F min gates, and V/F max gates, in some embodiments, some or all of these components may not be part of the processing unit. For example, a set of process level or chip level registers may host the limits for individual cores on the registers. As another example, the V/F max and V/F min may be set in processor level cache to be applied to all cores of the processor. In addition, a set of processing units may share common V/F min and V/F max gates.

Although examples refer to a V/F controller that controls both voltage and frequency, other controllers may be used. For example, embodiments could refer simply to a performance controller, where a performance controller could be a voltage controller, a frequency controller, or both a voltage and frequency controller.

Although examples refer to a V/F min gate clipping a V/F request that is less than the V/F min set by the performance supervisor, in some embodiments, V/F requests may be clipped that are less than or equal to the V/F min set by the performance supervisor. Likewise, in some embodiments, V/F requests may be capped by the V/F max gate that are greater than or equal to the V/F max set by the performance supervisor.

Although FIG. 5 refers to notifications for voltage and frequency settings, embodiments can notify for synchronization of voltage or frequency alone. For example, embodiments may allow processing units to notify the V/F data collector of voltage settings only or frequency settings only. In some embodiments, the V/F data collector may also be initialized to expect notifications about processing unit Pstates.

The example depicted in FIG. 6 discloses the performance supervisor resetting a counter in order to update state of the failsafe mechanism. Embodiments, however, can implement different techniques for maintaining state of the failsafe mechanism. In some embodiments, the performance supervisor performs a write to a memory element (e.g., register) at defined intervals to maintain a state that represents proper operation of the performance supervisor ("operational state"). In other embodiments, a system can be configured/programmed to maintain this state without explicit or direct manipulation by the performance supervisor. For example, a global and/or local failsafe mechanism can maintain state in a status or flag register. Each time the performance supervisor reads the status register, the read triggers an action (e.g., generate a write/refresh signal to itself) by the status register that maintains the operational state. Without the read operation by the performance supervisor, the state changes to a state representing failure of the performance supervisor. This circumvents an explicit operation by the performance supervisor to maintain state, and decreases the processing and bandwidth resources used for maintaining state in the failsafe mechanism as well as time.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for conforming performance setting requests to performance supervisor enforced rules without grant/deny overhead as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. An apparatus comprising:
a processing unit; and
a computer readable storage device having computer usable program code embodied therewith, the computer usable program code executable by the processing unit to cause the apparatus to,
   determine a maximum performance operating limit and a minimum performance operating limit in accordance with a set of one or more rules;
   indicate the maximum performance operating limit to the processing unit; and
   indicate the minimum performance operating limit to the processing unit;
wherein the processing unit comprises logic configured to:
   select at least one of a lesser of an operational setting and the maximum performance operating limit or the greater of the operational setting and the minimum performance operating limit; and
   output a request for a compliant operational setting to a performance controller.

2. The apparatus of claim 1, wherein the performance controller comprises at least one of a voltage controller, a frequency controller, or a voltage-frequency controller, wherein the operational setting indicates at least one of a frequency, a voltage, a voltage-frequency pair, or a performance state.

3. The apparatus of claim 1, wherein the processing unit comprises one of a processor or a processor core.

4. The apparatus of claim 1, wherein the request for the compliant operational setting comprises at least one of the operational setting, the minimum performance operating limit, or the maximum performance operating limit.

5. The apparatus of claim 1, wherein the operational setting indicates at least one of a voltage, a frequency, a voltage-frequency pair, or a performance state.

6. An apparatus comprising:
a performance supervisor;
a first failsafe mechanism;
a plurality of processing units; and
a computer readable storage device having computer usable program code embodied therewith, the computer usable program code executable by at least one of the plurality of processing units to cause the performance supervisor to,
   determine a maximum performance operating limit and a minimum performance operating limit in accordance with a set of one or more rules;
   indicate the maximum performance operating limit to a first of the plurality of processing units; and
   indicate the minimum performance operating limit to the first of the plurality of processing units;

wherein the first of the plurality of processing units comprises logic configured to:
ensure that a request for an operational setting complies with the maximum performance operating limit and the minimum performance operating limit; and
output a request for a compliant operational setting;
wherein the first failsafe mechanism comprises logic configured to:
detect a failure of the performance supervisor; and
in response to detection of the failure of the performance supervisor, output a first failsafe operational setting to the first of the plurality of processing units.

7. The apparatus of claim 6 further comprising an arbiter coupled with the plurality of processing units, wherein the arbiter comprises logic configured to:
receive compliant operational settings from the plurality of processing units; and
select a greatest of the compliant operational settings received from the plurality of processing units.

8. The apparatus of claim 7 further comprising a performance controller coupled with the arbiter, wherein the performance controller comprises logic configured to:
receive the greatest of the compliant operational settings selected by the arbiter; and
actuate the greatest of the compliant operational settings across the plurality of processing units.

9. The apparatus of claim 6 further comprising an arbiter coupled with the plurality of processing units and coupled with the performance supervisor, wherein the arbiter comprises logic configured to:
receive compliant operational settings from the plurality of processing units;
receive input from the performance supervisor; and
select a compliant operational setting of the compliant operational settings based, at least in part, on the input from the performance supervisor.

10. The apparatus of claim 9 further comprising a performance controller coupled with the arbiter, wherein the performance controller comprises logic configured to:
receive the compliant operational setting of the compliant operational settings; and
actuate the compliant operational setting of the compliant operational settings across the plurality of processing units.

11. The apparatus of claim 9 further comprising a data collector coupled with the performance supervisor and coupled with the plurality of processing units,
wherein each of the plurality of processing units comprises logic configured to notify the data collector upon actuation of a compliant operational setting;
wherein the data collector comprises logic configured to notify the performance supervisor in response to receiving one or more notifications from the plurality of processing units.

12. The apparatus of claim 6, wherein the first of the plurality of processing units further comprises:
a multiplexer configured to receive the compliant operational setting and a second failsafe operational setting; and
a second failsafe mechanism configured to:
detect a failure of the performance supervisor; and
in response to detection of the failure of the performance supervisor, cause the multiplexer to select the second failsafe operational setting.

13. A computer program product comprising:
a non-transitory computer readable storage medium having computer usable program code embodied therewith, the computer usable program code comprising a computer usable program code configured to,
set a minimum performance operating limit and a maximum performance operating limit for each of a plurality of processing units in a system in accordance with a set of one or more rules; and
in response to a request to change operation of a first processing unit of the plurality of processing units to a requested operational setting,
determine whether the requested operational setting complies with the minimum performance operating limit and the maximum performance operating limit;
send the minimum performance operating limit to a performance controller for the first processing unit if the requested operational setting does not comply with the minimum performance operating limit;
send the maximum performance operating limit to the performance controller if the requested operational setting does not comply with the maximum performance operating limit; and
send the requested operational setting to the performance controller if the requested operational setting complies with the minimum performance operating limit and the maximum performance operating limit for the first processing unit.

14. The computer program product of claim 13, wherein the requested operational setting comprises at least one of a requested voltage, a requested frequency, a requested voltage-frequency pair, or a requested performance state.

15. The apparatus of claim 12, wherein the first of the plurality of processing units further comprises logic configured to select the lesser of the first failsafe operational setting and an operational setting output by the multiplexer.

* * * * *